US008730511B2

(12) United States Patent
Yamazaki et al.

(10) Patent No.: US 8,730,511 B2
(45) Date of Patent: May 20, 2014

(54) PRINTING APPARATUS

(75) Inventors: Masataka Yamazaki, Kuwana (JP); Wataru Mizumukai, Nagoya (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 143 days.

(21) Appl. No.: 13/534,839

(22) Filed: Jun. 27, 2012

(65) Prior Publication Data

US 2013/0003124 A1 Jan. 3, 2013

(30) Foreign Application Priority Data

Jun. 28, 2011 (JP) ................................ 2011-143036

(51) Int. Cl.
*G06F 3/12* (2006.01)
*G06K 15/00* (2006.01)

(52) U.S. Cl.
USPC ......... 358/1.15; 358/1.1; 358/1.12; 358/1.13; 358/1.14; 358/1.18; 399/382

(58) Field of Classification Search
None
See application file for complete search history.

(56) References Cited

U.S. PATENT DOCUMENTS 8,259,327 B2 * 9/2012 Tanaka et al. ................ 358/1.15
2001/0031150 A1 10/2001 Shimada et al.
2003/0235446 A1 * 12/2003 Kudo et al. .................. 399/382
2006/0120780 A1 * 6/2006 Kudo et al. .................. 399/382
2009/0284790 A1 * 11/2009 Ohashi ........................ 358/1.15

FOREIGN PATENT DOCUMENTS

JP H04-020439 A 1/1992
JP 2001-309116 A 11/2001
JP 2007-058548 A 3/2007
JP 2009-301470 A 12/2009

* cited by examiner

*Primary Examiner* — Satwant Singh
(74) *Attorney, Agent, or Firm* — Merchant & Gould P.C.

(57) ABSTRACT

A printing apparatus is provided, which includes an instruction receiving unit which receives an execution instruction of a print job, a sheet receiving unit which receives printed sheets; a sorting unit which discharges a separation sheet for separating the printed sheets, and a control device which determine whether the print job is a first job to be executed while a user exists in the vicinity or a second job to be executed while the user dose not exist in the vicinity, and which executes the print job in a first mode where the sorting unit does not discharge the separation sheet, when the print job is the first job, and executes the print job in a second mode where the sorting unit discharges the separation sheet, when the print job is the second job.

13 Claims, 6 Drawing Sheets

FIG. 5

| TYPE OF PRINT JOB | RECEIVING INTERFACE |
|---|---|
| USB PC PRINTING | USB |
| NETWORK PRINTING | LAN |
| STORAGE PRINTING | OPERATION PANEL |
| SECURE PRINTING | OPERATION PANEL |
| COPY | OPERATION PANEL |
| FAX RECEPTION PRINTING | FAX |
| FAX STORAGE PRINTING | OPERATION PANEL |
| INTERNAL DATA PRINTING | OPERATION PANEL |

FIG. 6

| RECEIVING INTERFACE | SORTING FUNCTION |
|---|---|
| OPERATION PANEL | INVALID |
| LAN | VALID |
| FAX | VALID |
| USB | INVALID |

FIG. 7

SORTING FUNCTION SETTING

| RECEIVING INTERFACE | SEPARATION SHEET INSERTION | |
|---|---|---|
| OPERATION PANEL | ⊙ ON | ○ OFF |
| LAN | ○ ON | ⊙ OFF |
| FAX | ○ ON | ⊙ OFF |
| USB | ⊙ ON | ○ OFF |

☑ SEPARATION SHEET INSERTION IN EACH COPY UNIT FOR COPY UNIT BASIS PRINTING

PRINTING APPARATUS

CROSS-REFERENCE TO RELATED APPLICATION

This application claims priority from Japanese Patent Application No. 2011-143036, filed on Jun. 28, 2011, the entire subject matter of which is incorporated herein by reference.

TECHNICAL FIELD

Aspects of the present invention relate to a sorting technique of inserting a separation sheet between printed sheets in a printing apparatus.

BACKGROUND

There has been known a printing apparatus employing a technique of sorting printed sheets to be discharged to a tray. For example, whenever a last printed sheet of one print job is discharged to the tray, a separation sheet such as color sheet is discharged, thereby distinguishing printed sheets of the different print jobs (for example, see JP Hei 4-20439A).

SUMMARY

However, according to the above technique, even when the sheet of one print job is discharged and then a user immediately picks up the sheet from the tray, a separation sheet is always discharged. Therefore, a separation sheet may be wasted and it takes extra time to discharge the separation sheet.

Accordingly, an aspect of the present invention provides a technique capable of suppressing a separation sheet from being unnecessarily discharged.

According to an illustrative embodiment of the present invention, there is provided a printing apparatus including an instruction receiving unit, a printing unit, a sheet receiving unit, a sorting unit and a control device. The instruction receiving unit is configured to receive an execution instruction of a print job. The printing unit is configured to print an image on a sheet based on the print job. The sheet receiving unit is configured to receive thereon printed sheets discharged from the printing unit. The sorting unit is configured to discharge a separation sheet for separating the printed sheets discharged to the sheet receiving unit. The control device is configured to determine whether the print job is a first job which is executed while a user having input the execution instruction exists in the vicinity of the printing apparatus or a second job which is executed while the user dose not exist in the vicinity of the printing apparatus, and execute the print job in a first mode where the sorting unit does not discharge the separation sheet, when the determination unit determines that the print job is the first job, and configured to execute the print job in a second mode where the sorting unit discharges the separation sheet, when the determination unit determines that the print job is the second job.

BRIEF DESCRIPTION OF THE DRAWINGS

The above and other aspects of the present invention will become more apparent and more readily appreciated from the following description of illustrative embodiments of the present invention taken in conjunction with the attached drawings, in which:

FIG. 5 is a table showing a correspondence relation between types of a print job and interfaces which receive an execution instruction of the print job according to the first illustrative embodiment;

FIG. 6 shows an automatic determination table according to the first illustrative embodiment;

FIG. 7 shows a setting screen for setting an operation of a sorting function according to the first illustrative embodiment.

DETAILED DESCRIPTION

<First Illustrative Embodiment>

Hereinafter, a first illustrative embodiment of the present invention will be described with reference to FIGS. 1 to 7.

(Configuration of Printing Apparatus)

Figure 1:
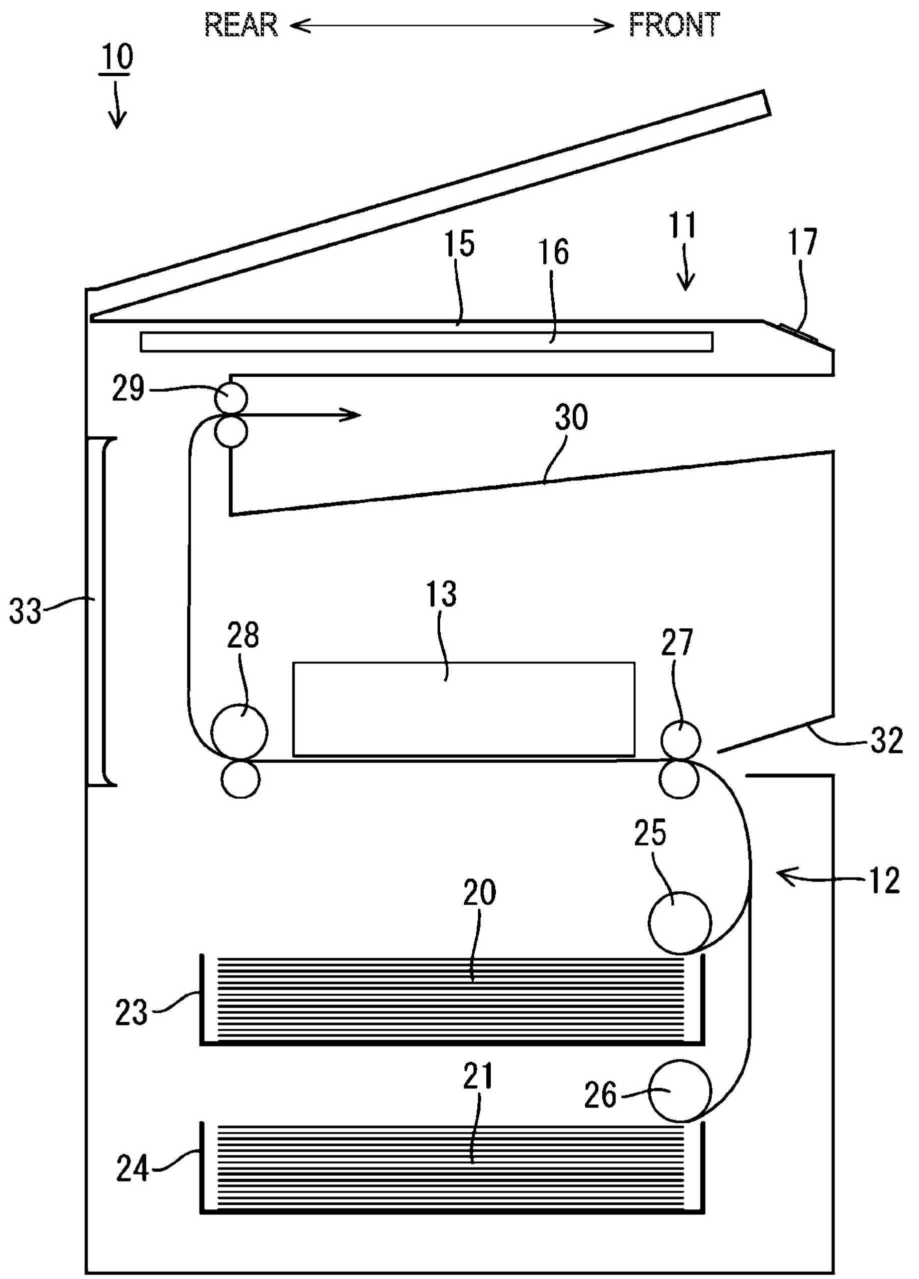
FIG. 1 shows a schematic configuration of a printing apparatus according to first and second illustrative embodiments.
Figure 2:
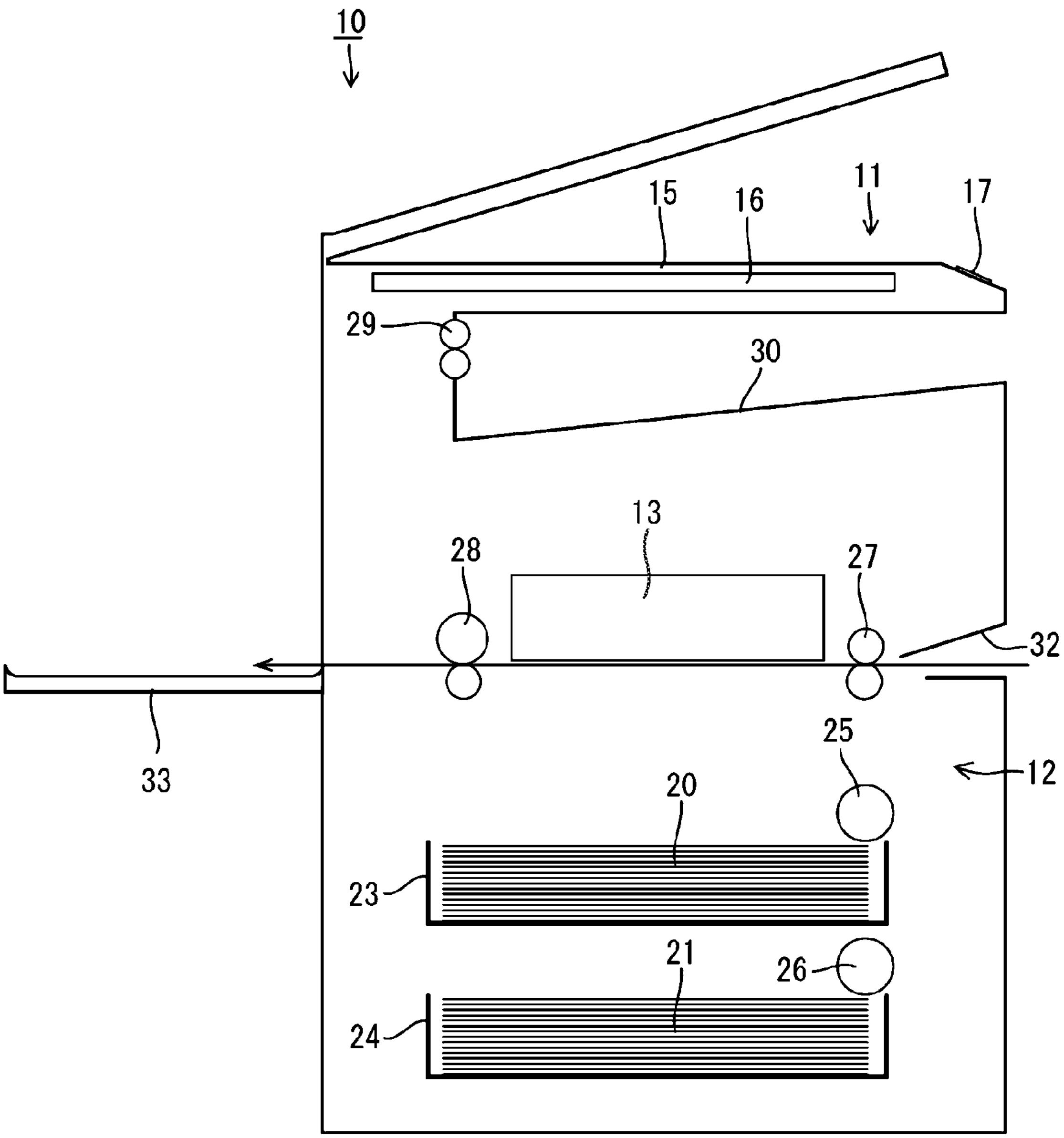
FIG. 2 shows a schematic configuration of the printing apparatus of FIG. 1 in a state where a rear cover is opened.

FIGS. 1 and 2 show a schematic configuration of a printing apparatus 10. The printing apparatus 10 is a multifunction apparatus having print, copying, facsimile functions and the like. As shown in FIG. 1, the printing apparatus 10 includes an original reading unit 11 which reads an original image, a conveyance unit 12 which conveys a sheet 20 and a separation sheet 21, and a printing unit 13 which prints an image on the sheet 20.

The original reading unit 11 includes a placement base 15, on which an original is placed, and a sensor unit 16 having an image sensor which reads the original placed on the placement base 15, a driving unit which drives the image sensor, and the like. Also, a front face side of the original reading unit 11 is provided with an operation panel 17 (an example of an instruction receiving unit, a first instruction receiving unit and an operation unit) having a plurality of buttons for receiving user's instruction inputs, and a display which displays messages, setting screens and the like.

The conveyance unit 12 (an example of a sorting unit, a manual feeding unit and an automatic feeding unit) includes a first feeding tray 23 which stacks therein a plurality of sheets 20 for printing and a second feeding tray 24 which stacks therein a plurality of separation sheets 21 for separating printed sheets 20. Regarding the separation sheet 21, a sheet having color, material quality, shape and the like different from the sheet 20 is used such that a user can easily distinguish between the separation sheet 21 and the sheet 20.

The conveyance unit 12 further includes a pair of pickup rollers 25, 26, first conveyance rollers 27, second conveyance rollers 28 and discharge rollers 29. The pickup rollers 25, 26 pick up the sheets 20 of the first feeding tray 23 and the separation sheets 21 of the second feeding unit 24 one by one, respectively. The first conveyance rollers 27 convey the sheet 20 and the separation sheet 21 picked up by the pickup rollers 25, 26 to the printing unit 13.

The printing unit 13 prints an image on the sheet 20 by a known electrophotographic method, the inkjet method and the like. The sheet 20 or separation sheet 21 having passed through the printing unit 13 are conveyed upward by the second conveyance rollers 28 and discharged to a discharge tray 30 (an example of a sheet receiving unit and a first sheet receiving unit) provided to an upper part of the printing apparatus 10 by the discharge rollers 29.

A front face of the printing apparatus 10 is provided with a manual insertion slot 32 such that a user can manually insert the sheet 20. The sheet 20 inserted from the manual insertion slot 32 is fed to the printing unit 13 by the first conveyance rollers 27 (hereinafter, referred to as a manual sheet feeding).

A rear face of the printing apparatus 10 is provided with an openable rear cover 33 (an example of a sheet receiving unit and a second sheet receiving unit). The user can displace the rear cover 33 between a non-using position of a closed state (refer to FIG. 1) and a using position of an opened state (refer to FIG. 2). As shown in FIG. 2, when the rear cover 33 is displaced to the using position, a discharge path of the sheet 20 is switched, so that the printed sheet 20 is discharged to the rear cover 33 by the second conveyance rollers 28 (hereinafter, referred to as a straight sheet discharge). That is, during the straight sheet discharge, the rear cover 33 functions as a sheet receiving unit which receives the printed sheet 20 thereon.

By combining the manual sheet feeding and the straight sheet discharge, the conveyance path of the sheet 20 becomes straight, so that cardboards, various postcards, envelopes and the like can be used as the sheet 20 in addition to the normal printing sheet.

Figure 3:
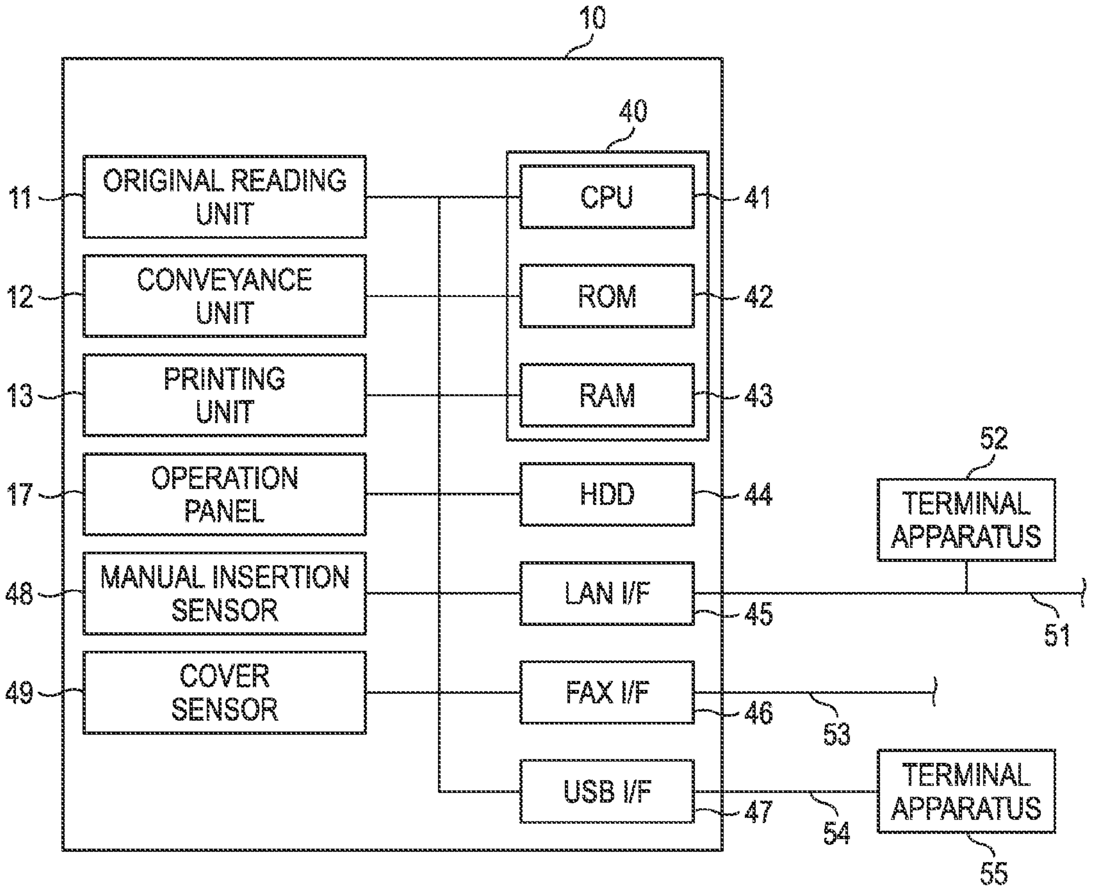
FIG. 3 is a block diagram schematically showing an electrical configuration of the printing apparatus according to the first and second illustrative embodiments.

FIG. 3 is a block diagram schematically showing an electrical configuration of the printing apparatus 10.

The printing apparatus 10 includes a control unit 40 configured by an Application Specific Integrated Circuit (ASIC) and the like. The control unit 40 includes a CPU 41, a ROM 42, a RAM 43 and the like.

The ROM 42 stores therein control programs for executing various operations of the printing apparatus 10, such as a print job execution processing. The CPU 41 (an example of a determination unit, a control unit and a setting change unit) controls the respective units according to the programs read out from the ROM 42. The RAM 43 is a volatile memory which is used as a work area of the CPU 41.

In addition to the original reading unit 11, the conveyance unit 12, the printing unit 13 and the operation panel 17, the printing apparatus 10 further includes a Hard Disk Drive (HDD) 44, a LAN interface 45, a facsimile interface 46, a USB interface 47, a manual insertion sensor 48 and a cover sensor 49. The HDD (an example of the storage unit) stores therein various setting values, read data, image data, facsimile data and the like.

The LAN interface 45 (an example of an instruction receiving unit, a second instruction receiving unit and a network communication unit) is connected to a network line 51 such as LAN and performs communication with a terminal apparatus 52 and the like connected on the network line 51. The facsimile interface 46 (an example of an instruction receiving unit, a second instruction receiving unit and a network communication unit) performs facsimile communication with an external facsimile apparatus (not shown) through a public switched telephone network 53.

The USB interface 47 (an example of an instruction receiving unit, a first instruction receiving unit and a connection unit) is connected to a terminal apparatus 55 (an example of an external apparatus) through a USB cable 54 and performs direct and local communication with the terminal apparatus 55. The manual insertion sensor 48 detects the sheet 20 which is inserted from the manual insertion slot 32 and outputs a detection signal to the CPU 41. The cover sensor 49 detects whether the rear cover 33 is opened or closed and outputs a detection signal to the CPU 41.

(Print Job Execution Processing)

Figure 4:
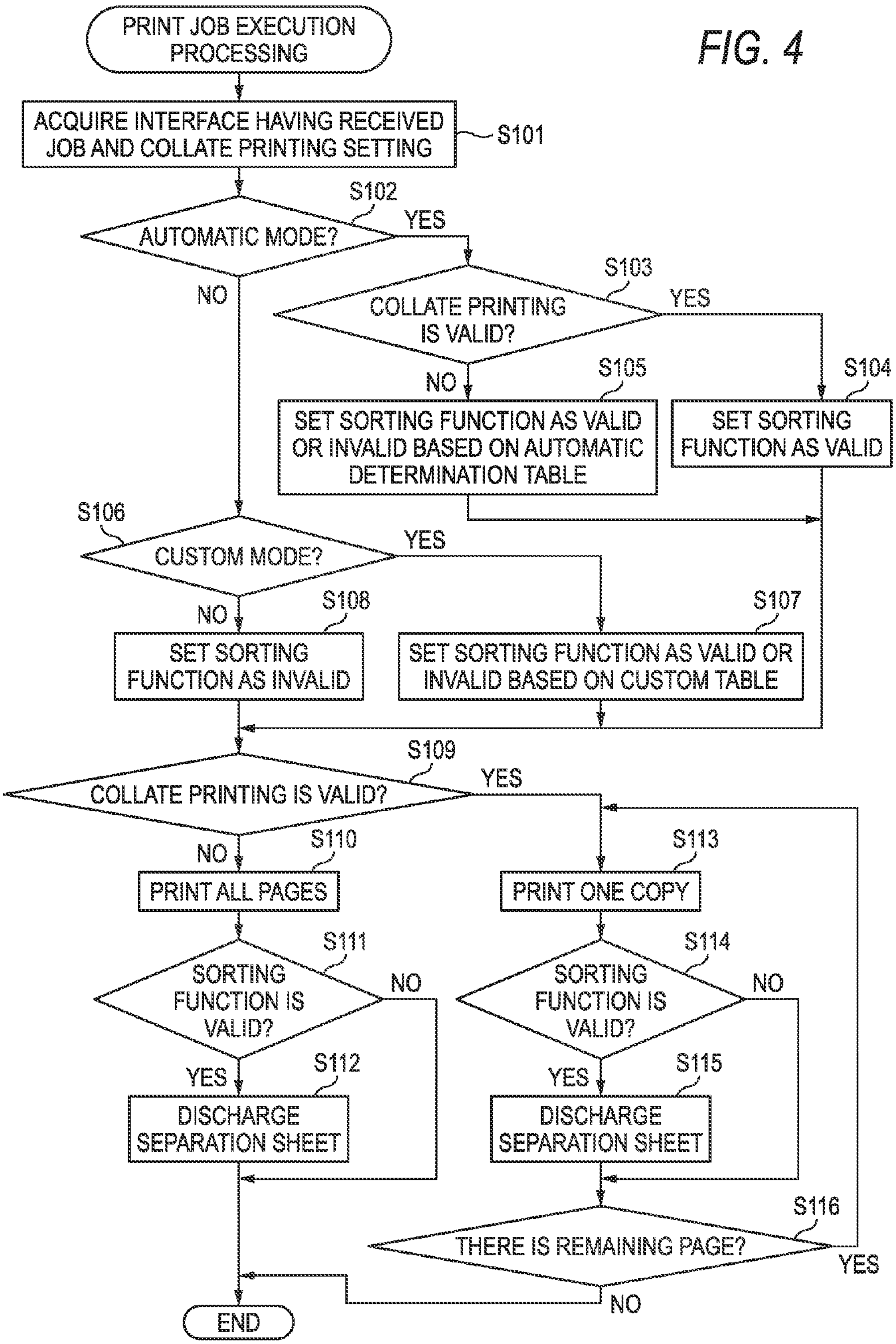
FIG. 4 is a flowchart showing a print job execution processing according to the first illustrative embodiment.

In the below, an operation of the print job execution processing which is executed when the printing apparatus 10 receives an execution instruction of a print job. The print job execution processing is repeatedly executed while the printing apparatus 10 is turned on. FIG. 4 is a flowchart of the print job execution processing.

When a print job is received, the CPU 41 starts the print job execution processing shown in FIG. 4. In the print job execution processing, the CPU 41 determines a type of the print job based on contents of the received print job, acquires an interface having received the execution instruction of the print job based on the type, and additionally acquires a setting value of a collate printing which is included in the print job (S101).

Here, the printing apparatus 10 can receive the execution instruction of the print job from any one of the plurality of interfaces, i.e., the operation panel 17, the LAN interface 45, the facsimile interface 45 and the USB interface 47 and execute a variety of print jobs accompanying printing operations. FIG. 5 is a table showing a correspondence relation between types of the print job and the interfaces which receive the execution instruction of the print job.

The 'USB PC printing' is to print print data which is received from the terminal apparatus 55 directly and locally connected to the USB interface 47, and an execution instruction is input from the terminal apparatus 55 by the user.

The 'network printing' is to print print data which is received from the terminal apparatus 52 connected to the network line 53 through the LAN interface 45, and an execution instruction is input from the terminal apparatus 52 by the user.

The 'storage printing' is to print read data stored in the HDD 44 in advance or other image data, and an execution instruction is input from the operation panel 17.

The 'secure printing' is to print print data which is transmitted from the terminal apparatus 52, is received through the LAN interface 45 and is stored in the HDD 44, in response to the user inputting a preset password through the operation panel 17, and an execution instruction is input from the operation panel 17.

The 'copy' is to print read data obtained by reading an original image with the original reading unit 11, and an execution instruction is input from the operation panel 17.

The 'FAX reception printing' is to print facsimile data received from an external facsimile apparatus through the facsimile interface 46, and an execution instruction is input from a facsimile apparatus of a fax source party.

The 'FAX storage printing' is to print facsimile data which is received from the external facsimile apparatus through the facsimile interface 46 and stored in the HDD 44, in response to the user inputting an instruction, and an execution instruction is input from the operation panel 17. In the meantime, the user can preset whether the received facsimile data is printed by the FAX reception printing or is stored in the HDD 44.

The 'internal data printing' is to print various setting values of the printing apparatus 10 stored in the HDD 44, destination data for facsimile communication and the like, and an execution instruction is input from the operation panel 17.

The execution instruction of the print job may include a setting value indicating valid or invalid of the collate printing. Here, the collate printing is to sort and discharge the printed sheets in a copy unit basis when printing a plurality of copies. For example, for a case where three pages are printed by three copies, when the collate printing is set as invalid, the printing is performed in page order of '1, 1, 1, 2, 2, 2, 3, 3, 3', and when the collate printing is set as valid, the printing is performed in page order of '1, 2, 3, 1, 2, 3, 1, 2, 3.'

Then, the CPU 41 determines whether an operation mode of a sorting function is set as an automatic mode (S102). Meanwhile, the operation mode of the sorting function includes an automatic mode, a custom mode and an off mode. The user can select any one operation mode from the operation panel 17 in advance and store the selected operation mode as the setting value in the HDD 44. When the operation mode is set as the automatic mode (S102: YES), the CPU 41 determines whether the collate printing is set as valid (S103). When the collate printing is set as valid (S103: YES), the CPU 41 sets the sorting function as valid (S104).

When the collate printing is set as invalid (S103: NO), the CPU 41 determines and sets whether the sorting function is set to be valid or invalid in accordance with an automatic determination table (an example of a first table), for example, shown in FIG. 6 (S105). The automatic determination table is a table in which the sorting function is set to be valid or invalid for each of the interfaces which receive the execution instruction of the print job. The automatic determination table may be stored in the HDD 44.

In this processing, the CPU 41 determines whether the sorting function is as valid or invalid, depending on whether there is a possibility that the user having input the execution instruction of the print job exists in the vicinity of the printing apparatus 10. That is, when the user having input the execution instruction of the print job exists in the vicinity of the printing apparatus 10, it is considered that there is a high possibility that the printed sheet 20 discharged onto the discharge tray 33 is picked up before the sheet 20 of a next print job is discharged, so that the sorting function is not necessary.

Hence, when the execution instruction of the print job is input from the operation panel 17 or the USB interface 47, the CPU 41 determines that there is a high possibility that the user having input the execution instruction exists in the vicinity of the printing apparatus 10, and sets the sorting function as invalid.

To the contrary, when the user having input the execution instruction of the print job does not exist in the vicinity of the printing apparatus 10, it is considered that there is a high possibility that the sorting function is necessary since it takes for the user to pick up the printed sheet 20 from the discharge tray 33 and thus the printed sheet tends to overlap with the sheet 20 of another print job.

Hence, when the execution instruction of the print job is input from the LAN interface 45 or facsimile interface 46, the CPU 41 determines that there is a high possibility that the user having input the execution instruction does not exists in the vicinity of the printing apparatus 10, and sets the sorting function as valid.

When the operation mode is not the automatic mode (S102: NO) and is set as the custom mode (S106: YES), the CPU 41 sets the sorting function as valid or invalid, in accordance with a custom table (an example of a second table) stored in the HDD 44 (S107). The custom table is a table in which setting values for determining the operation of the sorting function are stored. The setting values may be set by the user.

FIG. 7 shows a setting screen allowing the user to set the operation of the sorting function. The user may enable the setting screen to be displayed on the operation panel 17 in advance. In the setting screen, either one of validity (ON) and invalidity (OFF) may be selected and set for each of the interfaces which receive the execution instruction of the print job.

When the setting screen is first displayed, a state is displayed in which values corresponding to those of the automatic determination table of FIG. 6 are selected as initial values for each of the interfaces. The user can change the setting value of the desired interface by using the operation panel 17, thereby changing the operation of the sorting function from the operation at the time of the automatic mode.

Also, in the setting screen, it is allowed to set whether or not the inserting of the separation sheet 21 in each copy unit when the collate printing is set valid. The setting value set in the setting screen is stored as the custom table in the HDD 44. In S107, the CPU 41 sets the sorting function as valid or invalid, depending on the setting value corresponding to the type of the interface having received the execution instruction of the print job. In the meantime, for a setting where the separation sheet 21 is inserted in each copy unit during the collate printing, when the collate printing is valid in the print job, the sorting function is set valid irrespective of the types of the interface.

Also, when it is determined in S106 that the operation mode is not the custom mode (S106: NO), i.e., when the operation mode is set as the off mode, the CPU 41 sets the sorting function as invalid (S108).

After setting the sorting function as valid or invalid in S104, S107 or S108, the CPU 41 determines whether the collate printing is set as valid in the print job (S109). When the collate printing is not set as valid (S109: NO), the CPU 41 prints all pages included in the print job and discharges the printed sheets 20 to the discharge tray 33 (S110).

Subsequently, the CPU 41 determines whether the sorting function is set as valid (S111). When the sorting function is set as valid (S111: YES), the CPU 41 discharges the separation sheet 21 to the discharge tray 33 (S112) and ends the print job execution processing. On the other hand, when the sorting function is set as invalid (S111: NO), the CPU 41 ends the print job execution processing without discharging the separation sheet 21.

Also, when it is determined in S109 that the collate printing is set as valid (S109: YES), the CPU 41 performs the printing on the sheets 20 of one copy in the print job and discharge the printed sheets 20 of one copy to the discharge tray 33 (S113). Then, the CPU 41 determines whether the sorting function is set as valid (S114). When the sorting function is set as valid (S114: YES), the CPU 41 discharges the separation sheet 21 (S115). On the other hand, when the sorting function is set as invalid (S114: NO), the CPU 41 does not discharge the separation sheet 21.

Subsequently, the CPU 41 determines whether there is a remaining page (a copy not printed yet) (S116). When there is a remaining page (S116: YES), the CPU 41 returns to S113, prints a copy which is not printed yet and performs the same operations. When there is no remaining page (S116: NO), the CPU 41 ends the print job execution processing.

(Effects of First Illustrative Embodiment)

According to the first illustrative embodiment, it is determined that the print job is a first job which is executed while the user having input the execution instruction of the print job exists in the vicinity of the printing apparatus or a second job which is executed while the user does not exist in the vicinity of the printing apparatus. When it is determined that the print job is the first job, the print job is executed in the setting (first mode) where the separation sheet 21 is not discharged. When it is determined that the print job is the second job, the print job is executed in the setting (second mode) where the separation sheet 21 is discharged.

That is, when the user exists in the vicinity of the printing apparatus 10, it is considered that there is a high possibility that the discharged sheet 20 is picked up before the sheet 20 of a next print job is discharged. Thus, when it is determined that the print job is the first job which is executed while the user exists in the vicinity of the printing apparatus, the print job is executed in the first mode where the separation sheet 21 is not discharged. Thereby, it is possible to suppress the unnecessary discharge of the separation sheet 21.

Also, the printing apparatus 10 has the first instruction receiving unit (the operation panel 17, the USB interface 47) which receives the execution instruction, which is input by the user existing in the vicinity of the printing apparatus 10, and the second instruction receiving unit (the LAN interface 45, the facsimile interface 46) which receives the execution instruction, which is input by the user not existing in the vicinity of the printing apparatus. When the first instruction receiving unit receives the execution instruction, the printing apparatus determines that the print job is the first job, and when the second instruction receiving unit receives the execution instruction, the printing apparatus determines that the print job is the second job. Thereby, it is possible to determine whether the user exists in the vicinity of the printing apparatus 10, depending on the type of the instruction receiving unit which receives the execution instruction.

Also, when the execution instruction of the print job is input from the operation panel 17 of the printing apparatus 10, it is considered that the user exists in the vicinity of the printing apparatus 10. Hence, the sorting function is thus set as invalid.

Also, when the execution instruction of the print job is input through the LAN interface 45 or facsimile interface 46, it is considered that there is a high possibility that the user does not exist in the vicinity of the printing apparatus 10. Hence, the sorting function is thus set as valid.

Also, when the execution instruction of the print job is input from the terminal apparatus 55 which is directly and locally connected to the printing apparatus 10 through the USB interface 47, it is considered that there is a high possibility that the user exists in the vicinity of the printing apparatus 10. Hence, the sorting function is thus set as invalid.

Also, regarding the print jobs of the different types, the user can change the setting in the custom mode such that the operation different from that in the automatic mode is executed, depending on the interfaces which receive the execution instruction. Thereby, for example, when the execution instruction of the print job is input through the USB interface 47 from the terminal apparatus 55 which is located at a relatively distant position from the printing apparatus 10, the sorting function can be set as valid. Alternatively, when the execution instruction of the print job is input through the LAN interface 45 from the terminal apparatus 52 which is located in the vicinity of the printing apparatus 10, the sorting function can be set as invalid. Thereby, it is possible to change the operation in correspondence to the user's using manner.

Also, when performing the collate printing, it is considered that there is a high possibility that it is desired to sort the sheets 20 for each of the copies. Thus, in this case, whenever the sheets 20 of one copy are discharged, the separation sheet 21 is discharged, so that it is possible to insert the separation sheet 21 at a location at which the separation sheet 21 is highly needed.

<Second Illustrative Embodiment>

Next, a second illustrative embodiment of the present invention will be described with reference to FIG. 8.

In this illustrative embodiment, it is determined whether or not to insert the separation sheet 21, based on a user's operation other than the input of the execution instruction of the print job.

Figure 8:
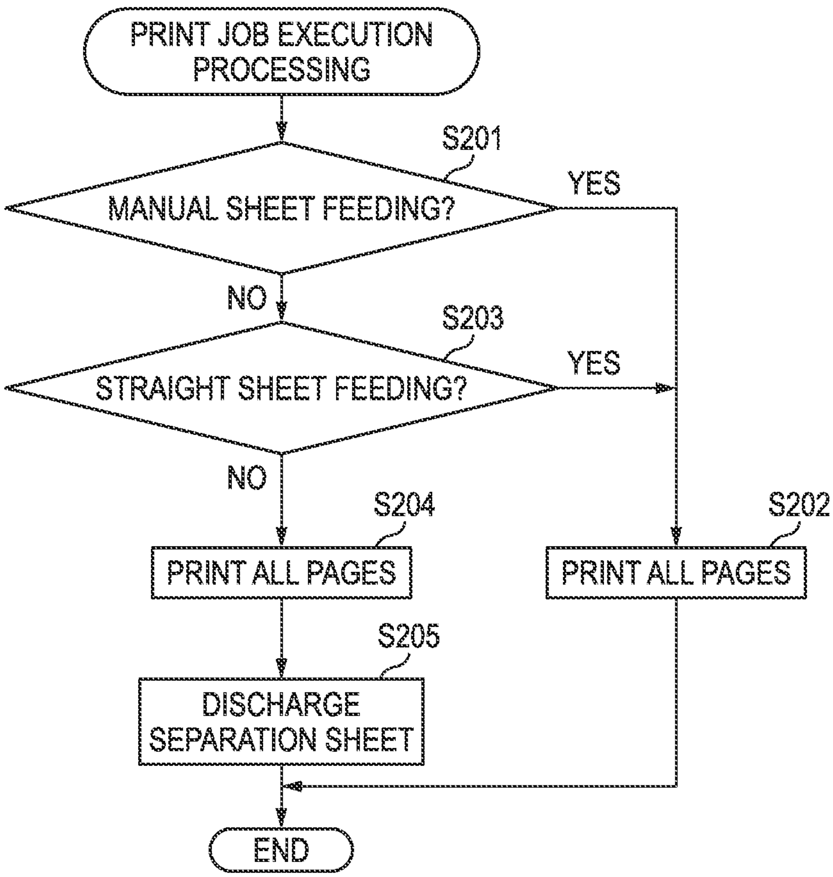
FIG. 8 is a flowchart showing a print job execution processing according to the second illustrative embodiment.

FIG. 8 is a flowchart showing a print job execution processing of the second illustrative embodiment. Here, since the configuration of the printing apparatus 10 is the same as that shown in FIGS. 1 to 3, the same constitutional elements are indicated with the same reference numerals and the descriptions thereof are omitted.

When starting the print job execution processing, the CPU 41 first determines whether the print job has a setting of the manual sheet feeding (S201). When inputting the execution instruction of the print job in the terminal apparatus 52 or terminal apparatus 55, the user can set the setting of the manual sheet feeding to be valid or invalid on the setting screen of a printer driver. When inputting the execution instruction of the print job from the operation panel 17, the user can also set the setting of the manual sheet feeding to be valid or invalid.

It is noted that the manual sheet feeding may not be set in the execution instruction. In this case, the manual sheet feeding may be set when the manually inserted sheet 20 is detected by the manual insertion sensor in a predetermined time period before the print job starts (before the sheet 20 is fed), and the sheet may be set to be fed from the first feeding tray 23 when the manually inserted sheet 20 is not detected.

When the print job has the setting of the manual sheet feeding (S201: YES), the CPU 41 prints all pages of the print job and discharges the printed sheets 20

(S202). Then, the CPU 41 ends the print job execution processing without discharging the separation sheet 21. That is, for the manual sheet feeding, it is considered there is a high possibility that the sorting is not necessary since the user exists in the vicinity of the printing apparatus 10 so as to pick up the manually inserted sheet 20. Hence, the separation sheet 21 is not discharged.

When the print job does not have the setting of the manual sheet feeding (S201: NO), the CPU 41 determines whether the print job has the setting of the straight sheet feeding (S203). For example, when the cover sensor 49 detects that the rear cover 33 is opened, the CPU 41 sets the straight sheet feeding. In the meantime, the user may set the straight sheet feeding as the mode of the sheet feeding when inputting the execution instruction of the print job with the operation panel 17 or terminal apparatus 52, 55.

Here, since the rear cover 33 is relatively shallow and small, it has a smaller receiving capability of the sheet 20, compared to the discharge tray 30. For example, the discharge tray 30 can receive several tends of sheets 20. In contrast, the rear cover can receive only two or three sheets 20. If the further sheets are discharged to the rear cover 33, the sheets 20 may be dropped.

When the straight sheet feeding is set (S203: YES), the CPU 41 proceeds to S202, prints all pages of the print job (S202) and then ends the print job execution processing without discharging the separation sheet 21. That is, for the straight sheet feeding, it is determined that the sorting is not necessary since the receiving capability of the rear cover 33 is smaller and it is thus necessary for the user to pick up the discharged sheet 20.

On the other hand, when the straight sheet feeding is not set (S203: NO), i.e., the setting of discharging the sheet 20 to the discharge tray 30 is set, the CPU 41 prints all pages of the print job (S204), discharges the separation sheet 21 (S205) and ends the print job execution processing.

That is, according to the second illustrative embodiment, when the sheet 20 is discharged to the rear cover 33 wherein the number of sheets 20 to be received (sheet receiving capability) is smaller, it is considered that there is a high possibility that the user exists in the vicinity of the printing apparatus 10 so as to pick up the sheet 20 to be discharged. Therefore, in this case, the separation sheet 21 is not discharged, so that it is possible to suppress the unnecessary discharge of the separation sheet 21.

Also, when the sheet 20 is manually fed, it is considered that the user exists in the vicinity of the printing apparatus 10. Accordingly, in this case, the separation sheet 21 is not discharged, so that it is possible to suppress the unnecessary discharge of the separation sheet 21.

<Other Illustrative Embodiments>

While the present invention has been shown and described with reference to certain illustrative embodiments thereof, it will be understood by those skilled in the art that various changes in form and details may be made therein without departing from the spirit and scope of the invention as defined by the appended claims.

(1) The types of the print job which can be executed are not limited to the above and can be appropriately changed. For example, for a direct printing where image data, which is stored in a storage medium connected to the USB interface 47 or card slot, is printed, it is considered that the user exists in the vicinity of the printing apparatus 10. Hence, in this case, the separation sheet 21 may not be inserted.

(2) In the above illustrative embodiments, the sheet having color and the like different from the sheet 20 for printing is used as the separation sheet 21. However, according to another illustrative embodiment of the present invention, the sheet 20 which is printed with a character or image for identifying the contents of the job or for identifying as a separation sheet may be used as the separation sheet 21. In this case, the sheet 20 in the same feeding tray 23 can be used as the separation sheet 21.

(3) The conditions for determining whether the user exists in the vicinity of the printing apparatus 10 are not limited to the above and can be appropriately changed. For example, when the operation of the operation panel 17 is detected, it may be determined that the user exists in the vicinity of the printing apparatus 10.

Also, in the printing apparatus 10 of performing a manual duplex printing where after one surface of the sheet 20 is printed, the user reverses the sheet 20 discharged onto the discharge tray 30 and sets the same in the first feeding tray 23 and then the other surface of the sheet 20 is printed, when the print job is a setting of the manual duplex printing, it may be determined that the user exists in the vicinity of the printing apparatus 10, and the separation sheet 21 may not be discharged.

Also, the above determination conditions and the other conditions may be appropriately combined. For example, when the straight sheet feeding is set, it may be determined that the user exists in the vicinity of the printing apparatus 10 even though the execution instruction is input from the LAN interface 45.

(4) In the above illustrative embodiments, the determination unit, the control unit and the setting change unit are implemented by the same CPU. However, according to another illustrative embodiment of the present invention, they may be configured by different CPUs, ASICs or other circuits.

(5) In the above illustrative embodiments, the sorting function is set as valid or invalid in the automatic mode or custom mode. However, it is not necessarily required to provide both the modes. That is, the sorting function may be always set based on the automatic determination table. In this case, the user may change the setting of the automatic determination table.

What is claimed is:

1. A printing apparatus comprising:

an instruction receiving unit configured to receive an execution instruction of a print job;

a printing unit configured to print an image on a sheet based on the print job;

a sheet receiving unit configured to receive thereon printed sheets discharged from the printing unit;

a sorting unit configured to discharge a separation sheet for separating the printed sheets discharged to the sheet receiving unit; and a control device configured to:

determine whether the print job is a first job which is executed while a user having input the execution instruction exists in the vicinity of the printing apparatus or a second job which is executed while the user dose not exist in the vicinity of the printing apparatus; and execute the print job in a first mode where the sorting unit does not discharge the separation sheet, when the determination unit determines that the print job is the first job, and configured to execute the print job in a second mode where the sorting unit discharges the separation sheet, when the determination unit determines that the print job is the second job.

2. The printing apparatus according to claim 1, wherein the instruction receiving unit includes:

a first instruction receiving unit configured to receive an execution instruction which is input by the user while the user is existing in the vicinity of the printing apparatus; and a second instruction receiving unit configured to receive an execution instruction which is input by the user while the user is not existing in the vicinity of the printing apparatus, and wherein the control device is configured to determine that the print job is the first job when the first instruction receiving unit receives the execution instruction, and is configured to determine that the print job is the second job when the second instruction receiving unit receives the execution instruction.

3. The printing apparatus according to claim 2, wherein the first instruction receiving unit includes an operation unit configured to receive an input operation of an execution instruction by the user.

4. The printing apparatus according to claim 2, wherein the second instruction receiving unit includes a network communication unit configured to receive an execution instruction through a network communication.

5. The printing apparatus according to claim 2, wherein the first instruction receiving unit includes a connection unit which is directly and locally connected to an external apparatus which outputs the execution instruction.

6. The printing apparatus according to claim 2, wherein the print job is classified into a plurality of different types based on at least the instruction receiving unit which receives the execution instruction, and wherein the control device is configured to change a setting for a print job of at least one type into a setting of executing a mode different from a mode corresponding to the determination of whether the print job is the first job or the second job, according to a user's instruction.

7. The printing apparatus according to claim 6, further comprising:

a storage unit configured to store therein a first table in which each type of the instruction receiving unit corresponds to one of the first mode and the second mode, and a second table in which each type of the instruction receiving unit corresponds to one of the first mode and the second mode, separately from the first table, wherein the control device is configured to change the correspondence of the second table, and wherein the control device is configured to switchably execute an automatic mode of executing a mode which corresponds to the type of the instruction receiving unit having received the execution instruction in the first table and a custom mode of executing a mode which corresponds to the type of the instruction receiving unit having received the execution instruction in the second table.

8. The printing apparatus according to claim 6, further comprising:

a storage unit configured to store therein a first table in which each type of the instruction receiving unit corresponds to one of the first mode and the second mode, wherein the control device is configured to change the correspondence in the first table, and wherein the control device is configured to execute a mode which corresponds to the type of the instruction receiving unit having received the execution instruction in the first table.

9. The printing apparatus according to claim 1, wherein the sheet receiving unit includes:

a first sheet receiving unit configured to receive thereon printed sheets; and a second sheet receiving unit configured to receive thereon printed sheets and having a sheet receiving capability smaller than that of the first sheet receiving unit, and wherein the control device is configured to determine that the print job is the first job when the sheet is discharged to the second sheet receiving unit.

10. The printing apparatus according to claim 9, wherein the second sheet receiving unit is switchable between a using position where the printed sheet is discharged and a non-using position where the printed sheet is not discharged, by a user's operation.

11. The printing apparatus according to claim 1, further comprising:

a manual feeding unit configured to feed a sheet, which is manually inserted by a user, to the printing unit; and an automatic feeding unit configured to feed a stacked sheet to the printing unit, wherein the control device is configured to determine that the print job is the first job when the sheet is fed from the manual feeding unit.

12. The printing apparatus according to claim 1, wherein the execution instruction includes a setting indicating that a collate printing of discharging sheets in a copy unit when printing a plurality of copies is valid or invalid, and wherein when the execution instruction includes the setting indicating that the collate printing is valid, the control device is configured to execute the print job in the second mode irrespective of the determination of whether the print job is the first job or the second job, and cause the sorting unit to discharge the separation sheet whenever the sheets of one copy are discharged.

13. A printing apparatus comprising:

first and second instruction receiving units configured to receive an execution instruction of a print job;

a printing unit configured to print an image on a sheet based on the print job;

a sheet receiving unit configured to receive thereon printed sheets discharged from the printing unit;

a sorting unit configured to discharge a separation sheet for separating the printed sheets discharged to the sheet receiving unit; and a control device configured to execute the print job while controlling the sorting unit according to which one of the first and second instruction receiving units the execution instruction of the print job is received.

* * * * *